Jan. 19, 1932. E. THOMAS 1,842,129
STEERING DEVICE FOR TRAILERS ATTACHED TO MOTOR VEHICLES
Filed Aug. 7, 1930
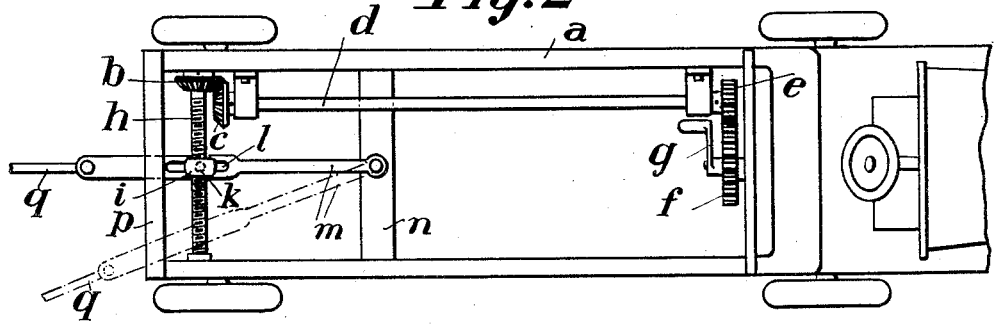
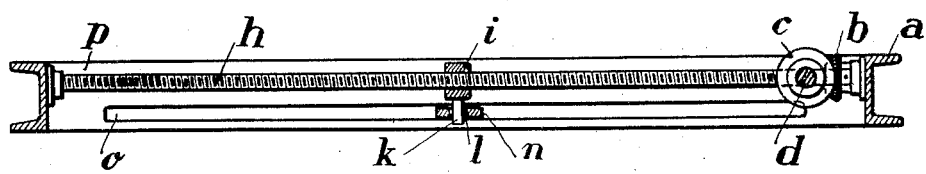
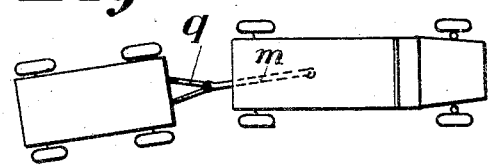
Inventor:
Emil Thomas Patented Jan. 19, 1932

1,842,129

UNITED STATES PATENT OFFICE

EMIL THOMAS, OF HEIDELOH, GERMANY

STEERING DEVICE FOR TRAILERS ATTACHED TO MOTOR VEHICLES

Application filed August 7, 1930, Serial No. 473,702, and in Germany June 25, 1930.

The object of the present invention is to produce a device whereby a trailer attached to a motor vehicle can be steered when required so as to follow the exact part of the motor vehicle, and the invention consists in connecting the tiller of the trailer to a horizontally movable arm which is pivoted to the motor vehicle and controlled by means of a screw spindle.
Fig. 1 of the accompanying drawings represents a side view of the motor vehicle, partly in section,
Fig. 2 is a top view of the chassis,
Fig. 3 is a cross-section of the vehicle frame
on an enlarged scale, and
Fig. 4 is a diagrammatic view of the vehicle and its trailer.
The trailer is provided with the usual tiller $q$ which according to the invention is pivoted to the free end of an arm $m$ arranged to move in a horizontal plane about a pivot mounted on a cross-bar $n$ attached to the chassis $a$ of a motor vehicle. The arm $m$ projects from the rear of the vehicle and is guided in an elongated slot $o$ made in the rear member $p$ of the vehicle frame. The latter also carries a screw spindle $h$ arranged so as to traverse the arm $m$, as shown in Fig. 2. A nut $i$ on the spindle is fitted with a pin $k$ which engages in an elongated slot $l$ in the arm $m$ and which thus controls the movements of the arm and of the tiller. The motor vehicle also carries a longitudinally arranged shaft $d$ which is operatively connected to the screw spindle by means of conical gears $b$ and $c$ and which can be rotated by means of a crank handle $g$ through the medium of spur gears $e$ and $f$.
When travelling in curves or when backing, the trailer can easily be steered by means of the crank handle $g$ so as to follow the desired path.
Owing to its simple construction the device is cheap and can easily be attached to any existing motor vehicle.
I claim:
In a steering device for trailers attached to motor vehicles, the combination with a motor vehicle frame composed of channelled members of which the rear member has a longitudinal slot, of a cross bar in said frame, an arm passing through and guided in the slot of the rear member and pivoted to said cross bar, a tiller on the trailer pivoted to the free end of said arm, a screw spindle mounted within the frame across the arm, a nut on said spindle, a pin on said nut engaging in a slot in the arm for controlling the movements of the latter and means for rotating the spindle.

EMIL THOMAS.